United States Patent [19]

Elberbaum et al.

[11] Patent Number: 5,249,051
[45] Date of Patent: Sep. 28, 1993

[54] METHOD AND APPARATUS FOR CONVERTING SYNCHRONIZING SIGNAL FOR TELEVISION CAMERAS

[75] Inventors: David Elberbaum, Tokyo; Yoshio Kaneta, Machida, both of Japan

[73] Assignee: Elbex Video Ltd., Tokyo, Japan

[21] Appl. No.: 806,014

[22] Filed: Dec. 9, 1991

[51] Int. Cl.$^5$ ............................................. H04N 5/04
[52] U.S. Cl. ................................. 358/148; 358/149; 358/150; 358/153
[58] Field of Search ............... 358/148, 149, 150, 151, 358/152, 153, 154, 156

[56] References Cited

U.S. PATENT DOCUMENTS

| | | | |
|---|---|---|---|
| 3,862,365 | 1/1975 | Kobayashi | 358/148 |
| 4,603,352 | 7/1986 | Kaneta | 358/149 |
| 4,723,164 | 2/1988 | Nienaber | 358/149 |

FOREIGN PATENT DOCUMENTS 2105150 3/1983 United Kingdom .

*Primary Examiner*—James J. Groody
*Assistant Examiner*—Sherrie Hsia
*Attorney, Agent, or Firm*—Helfgott & Karas

[57] ABSTRACT

In a method and apparatus for converting a synchronizing signal received from a controller for controlling a TV camera into a new synchronizing signal, a single frame synchronizing pulse for every two field pulses is generated on the basis of at least a vertical drive signal of the synchronizing signal received from the controller. The new synchronizing pulse which has a level higher than the white level and lower than the black level of a composite video signal generated by the TV camera is injected into a video transmission line connected to the TV camera for synchronizing the latter on the basis of the injected synchronizing pulse.

8 Claims, 6 Drawing Sheets

METHOD AND APPARATUS FOR CONVERTING SYNCHRONIZING SIGNAL FOR TELEVISION CAMERAS

BACKGROUND OF THE INVENTION

1. Field of the Invention

This invention relates to a method and an apparatus for receiving a synchronizing signal from means for controlling a television camera and converting the received synchronizing signal into a new synchronizing signal.

2. Description of the Prior Act

In a television monitoring system, as one of information transmission systems, at least one television monitor is switchably connected to a plurality of television cameras through a plurality of transmission lines. Therefore, the picture image from the television camera selected by the switching operation appears on the television monitor.

In such an information transmission system, it is necessary to synchronize the horizontal scanning and/or the vertical scanning of a plurality of television cameras in order to prevent the picture image on the monitor from being disturbed during and immediately after the selection and switching operation from one television camera to another.

As one of known devices for synchronizing a plurality of television cameras, there is an apparatus for transmitting synchronizing signals (which will be hereinafter referred to as a reference synchronizing signal) from control means, such as a controller, to the television cameras, and synchronizing the horizontal and vertical scannings of the television cameras with the transmitted reference synchronizing signals.

As the reference synchronizing signal in such a synchronizing apparatus, use is made of a vertical drive signal, a combination of the vertical drive signal and a horizontal drive signal, a vertical synchronizing signal, a composite synchronizing signal including the vertical synchronizing signal and a horizontal synchronizing signal, or a frame synchronizing signal having a level higher that the white level of a composite video signal and generated within the period of time corresponding to the vertical blanking interval in the composite video signal.

Since the reference synchronizing signals to be used are different, the reference synchronizing signal transmission methods are different, the apparatuses of this kind are respectively constructed different systems, depending on the reference synchronizing signals to be used, and are available in markets. Therefore, the instruments to be used are not interchangeable.

SUMMARY OF THE INVENTION

An object of the present invention is to give interchangeability to the instruments to be used.

In a converting method and an apparatus therefor according to the present invention, a reference synchronizing signal is received from means for generating either a vertical drive signal composed of field pulses for driving the vertical deflection of a television camera, a combination of the vertical drive signal and a horizontal drive signal, a vertical synchronizing signal, and a composite synchronizing signal composed of the vertical synchronizing signal and the horizontal synchronizing signal. These reference drive and/or synchronizing signals for synchronizing the television camera are converted by the apparatus of the present invention into a new frame synchronizing signal.

A converting method according to the present invention comprises the steps of generating, on the basis of the received reference synchronizing signal, a single frame synchronizing pulse having a level higher than the white level or lower than the black level of a composite video signal generated by the television camera, every two field pulses, and injecting the frame synchronizing pulse into a video transmission line connected to the television camera for synchronizing the television camera on the basis of the injected frame synchronizing pulse.

A converting apparatus according to the present invention comprises first signal processing means for receiving the reference synchronizing signal and generating, on the basis of the received reference synchronizing signal, a single frame synchronizing pulse for every two field pulses, and second signal processing means for receiving the pulse signal, and generating, on the basis of the received pulse signal, a frame synchronizing pulse having a level higher than the white level or lower than the black level of the composite video signal generated by the television camera.

The reference synchronizing signal outputted from means for controlling the television camera is converted into the frame synchronizing pulse having a predetermined level, and then, transmitted to the television camera. The converting apparatus according to the present invention is preferably placed at the side of the television monitor.

According to the present invention, the television camera synchronized by the frame synchronizing pulse is synchronized by other reference synchronizing signals.

In addition, according to the present invention, as the frame synchronizing pulse has the level higher than the white level or lower than the black level of the composite video signal, the frame synchronizing pulse is transmitted by the use of a transmission line for the video signal transmitted from the television camera to the television monitor.

In an embodiment, the converting apparatus according to the present invention further comprises third signal processing means for receiving a video signal transmitted from the television camera and injecting the frame synchronizing pulse into the received video signal within the period corresponding to the vertical blanking interval in the composite video signal. In this step, the frame synchronizing pulse is transmitted by the use of the transmission line for the video signal without affecting the video signal transmitted from the television camera.

In an embodiment, the converting apparatus according to the present invention further comprises fourth signal processing means for receiving a signal outputted from the third signal processing means, and removing the frame synchronizing pulse from the received signal. Therefore the picture image reproduced on the television monitor is not influenced by the frame synchronizing pulse.

In accordance with a modified embodiment of the present invention, the converting method and the apparatus therefor receive, as the reference synchronizing signal, from means for generating such reference synchronizing signal, a frame synchronizing pulse transmitted through a video transmission line connecting the television camera to a TV monitor, and having a level higher than the white level or lower than the black level of the composite video signal generated by the television camera, and convert the received frame synchronizing pulse into a composite synchronizing signal or a horizontal drive signal and a vertical drive signal.

In a modified embodiment, the converting method according to the present invention comprises the steps of separating the frame synchronizing pulse transmitted through the video transmission line from the composite video signal by comparing the level of signals transmitted through the video transmission line with a reference signal having a voltage level approximately equal to the voltage level of the frame synchronizing pulse, generating a composite synchronizing signal or a horizontal drive signal and a vertical drive signal on the basis of the separated frame synchronizing pulse, and applying the generated composite synchronizing signal or the generated horizontal and vertical drive signals to the television camera.

The converting apparatus according to a modified embodiment of the present invention comprises signal processing means for separating the frame synchronizing pulse transmitted through the video transmission line from the composite video signal by comparing the level of signals transmitted through the video transmission line with a reference signal having a voltage level approximately equal to the voltage level of the frame synchronizing pulse, generating a composite synchronizing signal, or a horizontal drive signal and a vertical drive signal on the basis of the separated frame synchronizing pulse, and applying the generated composite synchronizing signal or the generated horizontal and vertical drive signals to the television camera.

The frame synchronizing pulse transmitted through the transmission line is converted into the composite synchronizing signal or the horizontal and vertical drive signals, and then, is fed to the television camera. Thus, it is preferable that the converting apparatus of the modified embodiment of the present invention be placed at the side of the television camera.

According to the modified embodiment of the converting method and the apparatus therefor, the television camera synchronized by the composite synchronizing signal or the horizontal and vertical drive signals is synchronized by the frame synchronizing pulse.

The frame synchronizing pulse is separated from the composite video signal by comparing the level of the transmitted signal with the reference signal having the voltage level approximately equal to the voltage level of the frame synchronizing pulse, so that the frame synchronizing pulse is surely separated by a commercially available, simple and inexpensive comparison circuit.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
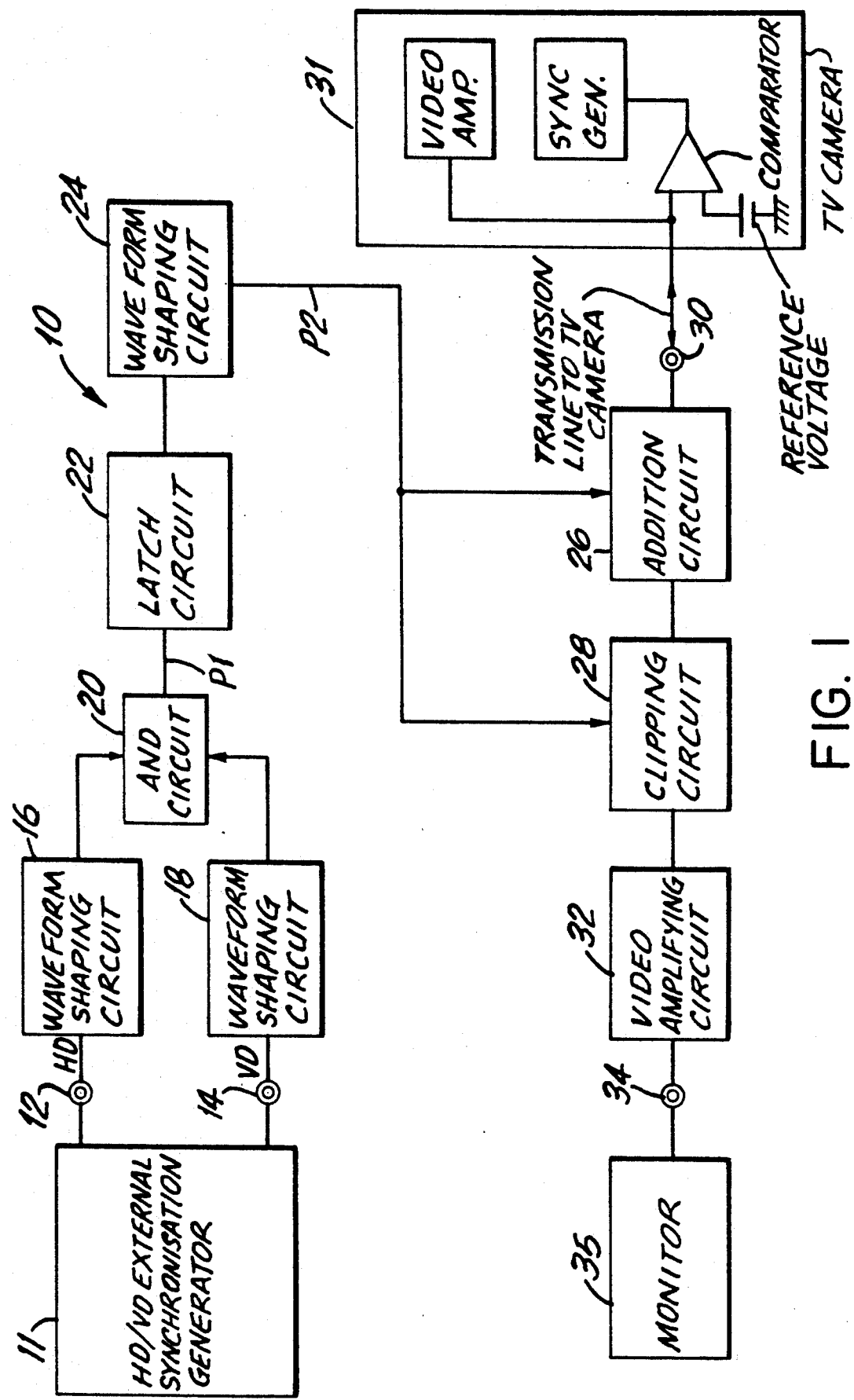
FIG. 1 is a block diagram of an electric circuit of a synchronizing signal converting apparatus according to a first embodiment of the present invention.
Figure 2A:
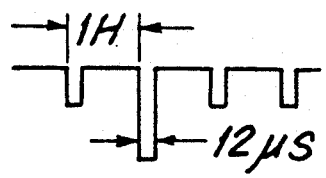
FIG. 2A through 2H show the waveform of the electric signals processed in the apparatus of FIG. 1.
Figure 2B:
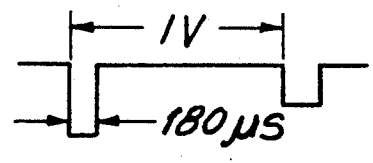

Referring to FIG. 1, a synchronizing signal converting apparatus 10 converts reference synchronizing signals of a horizontal drive signal HD shown in FIG. 2(A) and a vertical drive signal VD shown in FIG. 2(B), received from terminals 12 and 14, respectively, into a frame synchronizing pulse. In case of NTSC (National Television System Committee) system, both drive signals HD and VD are 15750Hz and 60Hz, respectively.

The phases of the horizontal drive signal HD and the vertical drive signal VD correspond to those of horizontal and vertical synchronizing signals of a composite synchronizing signal, respectively. Therefore, in an illustrated embodiment, the vertical drive signal VD itself acts as a field pulse which is made to correspond to each field of interlaced scanning.

The time axes of the signal waveform, i.e., the dimensions of a quadrature axis are not identical. Therefore, an example is shown with respect to the specific values of the pulse width in the cases these values are applied to the NTSC system.

The horizontal drive signal HD and the vertical drive signal VD are fed from well known control means that is, a generator of the horizontal and vertical drive signals 11, to terminals 12 and 14, respectively, and are further fed from the terminals 12 and 14 to waveform shaping circuits 16 and 18, respectively.

Figure 2C:
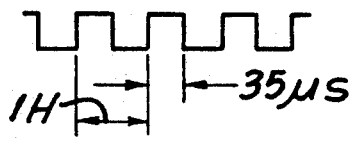
Figure 2E:
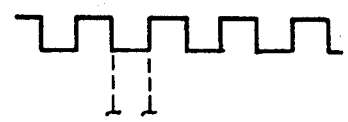
Figure 2D:
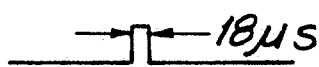

The waveform shaping circuit 16 outputs a pulse signal, as shown in FIGS. 2(C) and 2(D), rising for a constant period of time in synchronism with the horizontal drive signal HD, to one input terminal of AND circuit 20 on the basis of the fed horizontal drive signal HD.

Figure 2F:

On the other hand, the waveform shaping circuit 18 outputs a pulse signal, as shown in FIGS. 2(E) and 2(F), rising for a constant period of time in synchronism with the vertical drive signal VD, to another input terminal of the AND circuit 20 on the basis of the fed vertical drive signal VD.

Both pulse signals outputted from both waveform shaping circuit 16 and 18 satisfy the AND condition in the AND circuit 20 in the first field of each frame of interlaced scanning, as shown in FIGS. 2(C) and 2(D), whereas these pulse signals do not satisfy the AND condition in the AND circuit 20 in a second field, as shown in FIGS. 2(E) and 2(F).

As a result, a pulse signal P1 synchronized with the vertical drive signal of the first field is outputted from the AND circuit 20 in response to the first field every one frame of interlaced scanning, that is, every two fields.

Figure 2G:
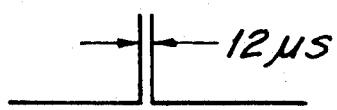

The pulse signal P1 outputted from the AND circuit 20 is fed to a waveform shaping circuit 24 through a latch circuit 22, and then converted into a pulse signal P2 having a predetermined peak value and a predetermined pulse width shown in FIG. 2(G) in the waveform shaping circuit 24.

The pulse signal P2 outputted from the waveform shaping circuit 24 is fed to an addition circuit 26, and also fed to a clipping circuit 28.

A phase corresponding to the vertical blanking interval in the composite video signal is given to the pulse signal P2, and, at the same time, a level higher than the white level of the composite video signal is given to the pulse signal. Furthermore, the pulse signal P2 is generated every two vertical drive signals. Therefore, in the illustrated embodiment, the pulse signal P2 itself composes a frame synchronizing pulse.

The addition circuit 26 is connected through its terminal 30 to a transmission line for the video signal transmitted from the television camera 31, and therefore, receives the transmitted video signal from the television camera through the terminal 30.

The addition circuit 26 injects the pulse signal P2 fed from the waveform shaping circuit 24, that is the frame synchronizing pulse, into the transmission line connected to the terminal 30. By doing this, the signal from the terminal 30 results in a signal shown in FIG. 2(H), in which the pulse signal P2 is injected into the video signal fed to the terminal 30 from the television camera 31 within the period corresponding to the vertical blanking interval.

Addition circuit 26 may be an injection circuit having a circuit construction such as a wire OR circuit by using a plurality of resistors and diodes.

The television camera 31 controlled by the pulse signal P2 is a well known television camera using the pulse signal P2 as the reference synchronizing signal, as described in U.S. Pat. No. 4,603,352, the contents of which are incorporated herein by reference.

A television camera used for the above-described process is a TV camera which includes means for comparing the level of the received signal with a reference signal having a predetermined voltage level higher than the white level of the composite video signal and generating a control pulse when both levels are coincident with each other or when the level of the received signal is higher than the reference value, and means for receiving the control pulse and generating an internal synchronizing signal on the basis of the received control pulse, whereby the television camera is driven by the generated internal synchronizing signal.

Figure 2H:
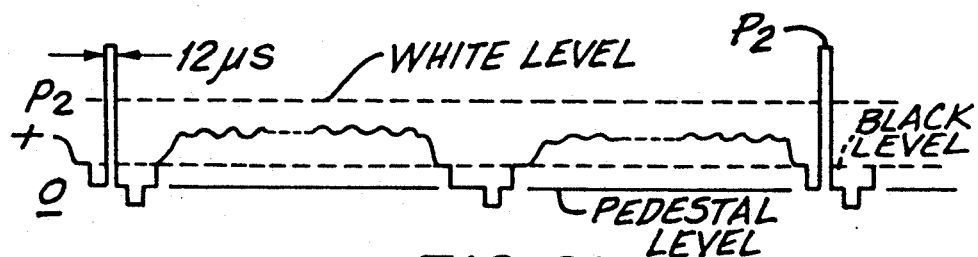

As shown in FIG. 2(H), the pulse signal P2 has a phase existing within the period corresponding to the vertical blanking interval in the composite video signal. Therefore, the video signal itself is not influenced by the pulse signal P2, even though the pulse signal P2 is transmitted to the television camera through the transmission line for the video signal transmitted from the television camera controlled by the pulse signal P2 to the television monitor, as will be discussed below.

The addition circuit 26 also feeds the video signal received from the terminal 30 to the clipping circuit 28. The signal fed from the addition circuit 26 to the clipping circuit 28 also results in a signal shown in FIG. 2(H), in which the pulse signal P2 is added to the video signal fed to the terminal 30 from the TV camera.

For this reason, the clipping circuit 28 clips the level of a portion, which corresponds to the pulse signal P2, in the video signal into a level lower than the white level of the composite video signal, on the basis of the pulse signal P2, and outputs the clipped video signal to a video amplifying circuit 32.

In this process, even though the pulse signal P2 is included in the video signal fed to the clipping circuit 28, the pulse signal P2 is essentially removed by the clipping circuit 28. Therefore, a new video signal outputted from the clipping circuit 28 does not include the pulse signal P2.

As a result, the pulse signal P2 is transmitted to the television camera through the transmission line for the video signal, as shown in FIG. 2(H).

The new video signal outputted from the clipping circuit 28 is amplified in the video amplifying circuit 32, and then fed to a television monitor 35 through a terminal 34.

The period for clipping the pulse signal P2 into the level lower the white level is set as a time range of 50 $\mu$s centering the pulse signal P2, for instance.

The converting apparatus according to the present invention is also capable of controlling the well known television camera utilizing the pulse signal P2, that is, the frame synchronizing pulse as the reference synchronizing signal by well known control means for outputting the horizontal and vertical drive signals HD and VD as the reference synchronizing signal.

Instead of using both the horizontal drive signal HD and the vertical drive signal VD, the frame synchronizing pulse may be generated only by using the vertical drive signal VD. Such a device may be composed, for instance, by using a circuit for generating the pulse signal P1 on the basis of the output signal of the waveform shaping circuit 18, instead of the waveform shaping circuit 16 and the AND circuit 20 in the signal converting apparatus 10.

Figure 3:
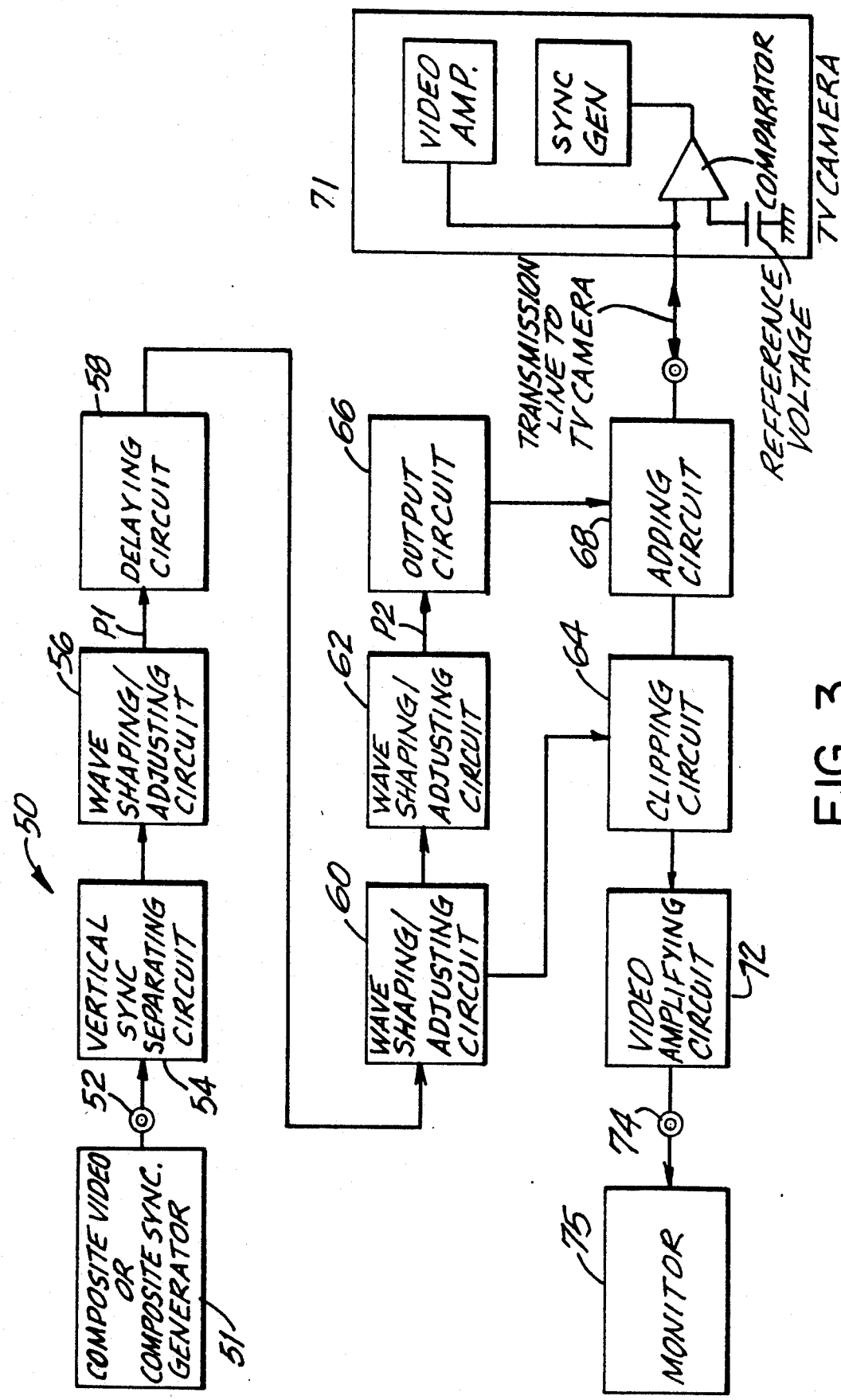
FIG. 3 is a block diagram of an electric circuit of a synchronizing signal converting apparatus according to another embodiment of the present invention.
Figure 4A:
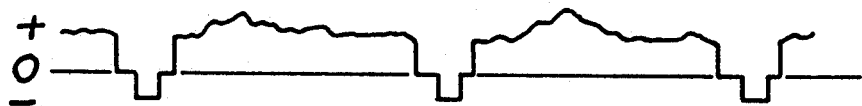
FIG. 4A through 4E show the waveform of the electric signals processed in the apparatus of FIG. 3.

Referring to FIG. 3, a synchronizing signal converting apparatus 50 of the illustrated embodiment receives a composite video signal shown in FIG. 4(A), as the reference synchronizing signal, from well known control means that is, a composite video signal generator 51 (standard sync generator used by TV transmission) to a respective terminal 52. As the control means for outputting such a composite video signal, there are controllers, monitors and standard television cameras or the like.

In general, the composite video signal includes a composite synchronizing signal of horizontal and vertical synchronizing signals. The vertical synchronizing signal generally includes a field pulse corresponding to each field of interlaced scanning. Therefore, the synchronizing signal converting apparatus 50 generates the frame synchronizing pulse by using the field pulse.

Figure 4B:

The vertical synchronizing signal in the composite video signal fed to the terminal 52 is separated from other signals in a synchronizing separation circuit 54, and then converted into a signal of the waveform rising every first field of interlaced scanning and lowering every second field, as shown in FIG. 4(B). Thereafter, the converted signal is fed to a waveform shaping or adjusting circuit 56.

Figure 4C:
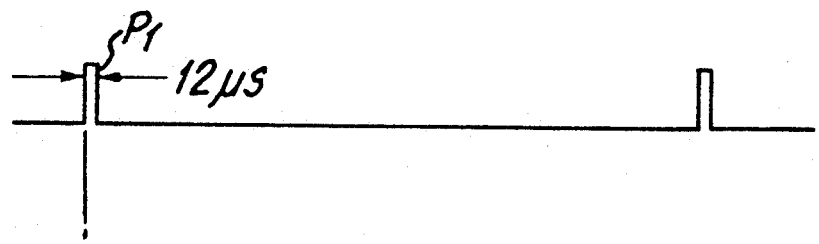

The waveform shaping or adjusting circuit 56 converts the output signal of the synchronous separation circuit 54 into a pulse signal P1 rising during a predetermined period of time from the rising time of the output signal, as shown in FIG. 4(C). Therefore, the pulse signal P1 is generated, corresponding to the first field every one frame.

Figure 4D:
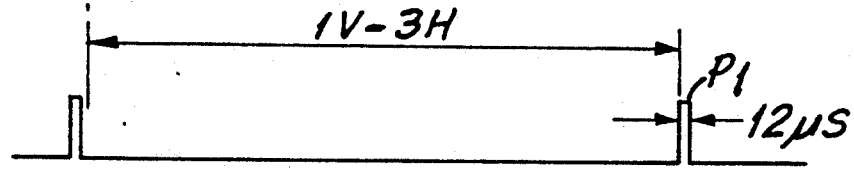

The pulse signal P1 is delayed for a time slightly shorter than one frame time in a delay circuit 58, as shown in FIG. 4(D), and then fed to a waveform shaping circuit 60.

Figure 4E:
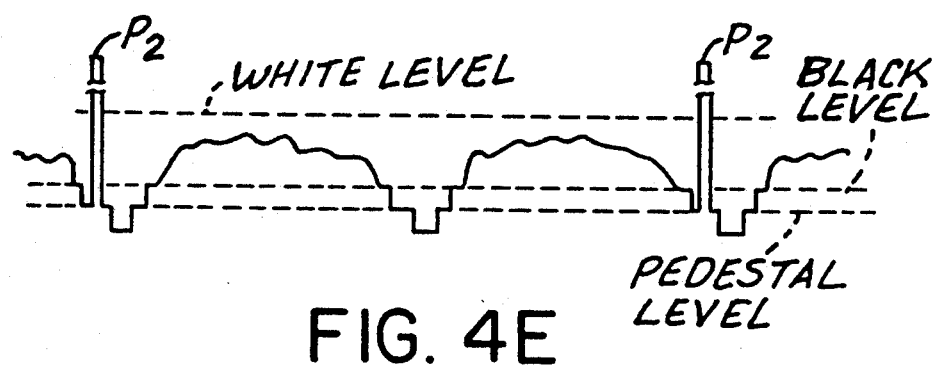

The waveform shaping circuit 60 converts the pulse signal P1 into a signal of a predetermined pulse width, and then outputs the converted signal to a waveform shaping or adjusting circuit 62 and a clipping circuit 64. The waveform shaping circuit 62 converts the fed pulse signal into a pulse signal P2 having a predetermined peak value and a predetermined pulse width, as shown in FIG. 4(E). The converted pulse signal P2 is outputted to an addition circuit 68 through an output circuit 66.

A phase corresponding to the vertical blanking interval in the composite video signal, and also a level higher than the white level of the composite video signal are given to the pulse signal P2 Further, the pulse signal P2 is generated every two vertical synchronizing signals. Therefore, in the illustrated embodiment, the pulse signal P2 itself composes the frame synchronizing pulse.

The addition circuit 68 is connected through its terminal 70 to a transmission line for a composite video signal transmitted from the television camera, and therefore, receives the transmitted composite video signal from a television camera 71 through the terminal 70.

The addition circuit 68 has the same function as the addition circuit 26 shown in FIG. 1. Therefore, the addition circuit 68 injects the pulse signal P2 fed from the output circuit 66, that is, the frame synchronizing pulse, into the transmission line connected to the terminal 70. By this process, the signal from the terminal 70 results in a signal shown in FIG. 4(E), in which the pulse signal P2 is injected into the video signal fed to the terminal 70 from television camera 71 within the period corresponding to the vertical blanking interval.

The television camera 71 controlled by the pulse signal P2 outputted from the converting apparatus 10 is also a well known television camera using the frame synchronizing pulse as the reference synchronizing signal.

The clipping circuit 64 receives the video signal fed from the television camera 71 to the terminal 70. The clipping circuit 64 clips the level of a pulse period, which corresponds to the pulse signal P2 in the video signal, into a level lower than the white level of the composite video signal on the basis of the pulse signal fed from the waveform shaping circuit 60, and outputs the clipped, new video signal to a video amplifying (video output) circuit 72 in the manner described in connection with FIG. 1.

Therefore, in the converting apparatus 50, even though the pulse signal P2 is included in the video signal fed to the clipping circuit 64, the pulse signal P2 is essentially removed by the clipping circuit 64, so that the new video signal outputted from the clipping circuit 64 does not include the pulse signal P2.

As a result, the pulse signal P2 is transmitted to the television camera through the transmission line for the video signal. In this case, the video signal fed to the clipping circuit 64 results in the signal shown in FIG. 4(E).

The period for clipping the level of the video signal portion into the level lower than the white level is set within a time range of 50 $\mu$s centering the pulse signal P2, for instance. This time width is defined by the width of the pulse signal fed from the waveform shaping circuit 60 to the clipping circuit 64.

The new video signal outputted from the clipping circuit 64 is amplified in the video amplifying circuit 72, and then fed to a monitor 75 through a terminal 74.

The converting apparatus 50 is capable of controlling the television camera using the known external synchronizing signal as the reference synchronizing signal by the known control means or outputting the composite video signal as the reference synchronizing signal, as disclosed in the above mentioned U.S. patent.

Since the converting apparatus 50 is constructed to process either the composite synchronizing signal or the vertical synchronizing signal in the composite synchronizing signal, instead of the composite video signal, in the synchronous separation circuit 54, this converting apparatus 50 may be applied to an apparatus for synchronizing the television camera 71, using the external synchronizing signal, as the reference synchronizing signal generated by the known control means outputting the composite synchronizing signal or the vertical synchronizing signal.

The waveform shaping circuit 62 may be omitted in the converting apparatus 50, and instead, the output signal of the delaying circuit 58 may be fed as the pulse signal P2 to the output circuit 66.

Figure 5:
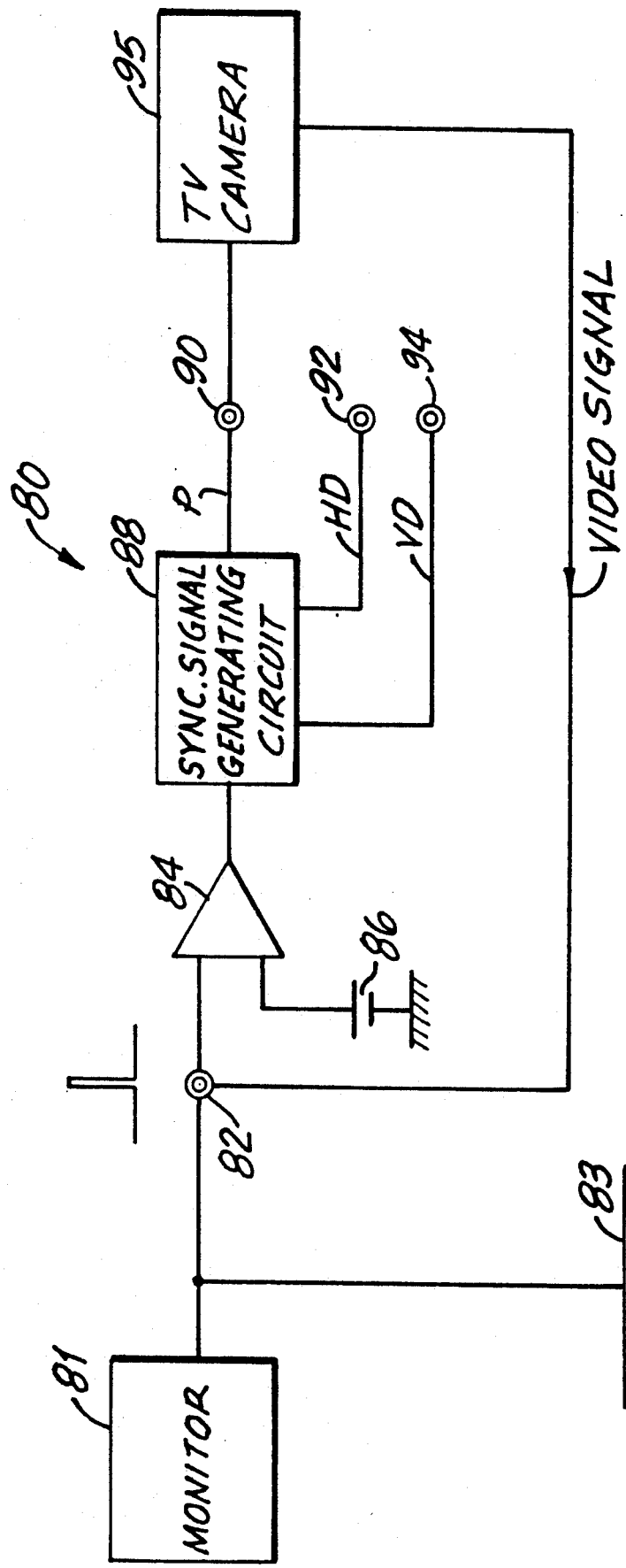
FIG. 5 is a block diagram of an electric circuit of a synchronizing signal converting apparatus of a further embodiment of the present invention.

In the embodiment shown in FIG. 5, a synchronizing signal converting apparatus 80 receives a frame synchronizing pulse, as the reference synchronizing signal, from the known control means (a TV monitor 81 and-/or external sync generator 83) to a terminal 82. The circuit shown in FIG. 5 is provided for a composite synchronizing signal controlled TV camera 95. TV camera 95 is also connected at the output thereof to terminal 82.

The frame synchronizing pulse has a level higher than the white level of the composite video signal, as well as the pulse signal P2 shown in FIGS. 2(H) and 4(E). The phase of the frame synchronizing pulse is within the period corresponding to the vertical blanking interval in the composite video signal, and has a voltage level higher than the white level of the composite video signal.

The frame synchronizing pulse is fed from monitor 81 or external sync generator 83 to one input terminal of a comparison circuit 84 through terminal 82. The other terminal of the comparison circuit 84 is connected to a reference voltage source 86, and receives the reference voltage having a voltage level higher than the white level of the composite video signal, from the reference voltage source 86.

The comparison circuit 84 compares the voltage level of the signal fed from the terminal 82 with a reference voltage value of the reference voltage source 86 and generates a pulse signal synchronized with the frame synchronizing pulse when both levels are coincident with each other or when the level of the signal fed from the terminal 82 is higher than the reference voltage value. Then, the comparison circuit 84 outputs the generated pulse signal to a synchronizing signal generating circuit 88.

The synchronizing signal generating circuit 88 generates, on the basis of the pulse signal fed from the comparison circuit 84, a composite synchronizing signal P, the horizontal drive signal HD corresponding to the horizontal synchronizing signal and the vertical drive signal VD corresponding to the vertical synchronizing signal, and outputs these signals to terminals 90, 92 and 94, respectively. As such a synchronizing signal generating circuit 88 is commercially available as one of semiconductor integrated circuits and is also disclosed in the above mentioned patent, the detailed description thereof will be omitted.

Figure 6:
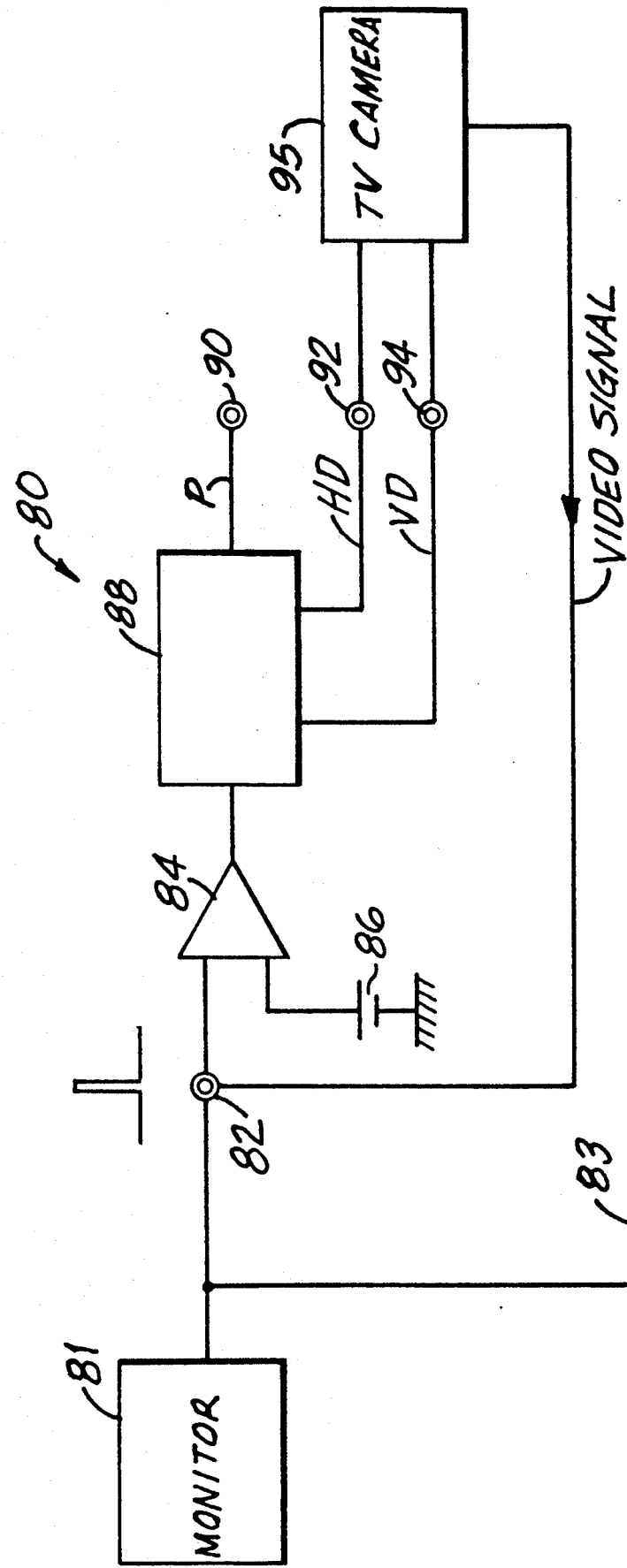
FIG. 6 is a block diagram of an electric circuit of a synchronizing signal converting apparatus of yet another embodiment of this invention.

In case the television camera 95 to be controlled is driven by the composite video signal or the composite synchronizing signal, the terminal 90 is connected to the television camera to be controlled. On the other hand, in case the television camera 95 to be controlled is driven by the horizontal and vertical drive signals HD and VD, the terminals 92 and 94 are connected to the television camera to be controlled, as shown in FIG. 6.

Therefore, the converting apparatus 80 may generate either of the composite video signal, the composite synchronizing signal or the horizontal and vertical drive signals HD and VD, depending on the type of the television camera to be controlled.

In case the television camera to be controlled receives the vertical synchronizing signal, a well known synchronizing signal separation circuit is connected to the terminal 90 in the converting apparatus 80, and the vertical synchronizing signal is separated from the composite synchronizing signal in the synchronizing signal separation circuit. Then, the separated vertical synchronizing signal is fed to the television camera.

Furthermore, the level of the frame synchronizing pulse may be a level lower than the black level of the composite video signal, preferably a level lower than the level of the composite synchronizing signal.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for converting a frame synchronizing pulse transmitted via a video transmission line connected to a television camera into a composite synchronizing signal, wherein said frame synchronizing pulse has a level higher than the white level or lower than the black level of a composite video signal generated by said television camera, the method comprising the steps of:
    separating said frame synchronizing pulse transmitted over said video transmission line from said composite video signal by comparing the level of signals transmitted over said video transmission line with a reference signal having a voltage level approximately equal to the voltage level of said frame synchronizing pulse;
    generating a new composite synchronizing signal on the basis of the separated frame synchronizing pulse; and
    applying said new composite synchronizing signal to said television camera.

2. A method for converting a frame synchronizing pulse transmitted via a video transmission line connected to a television camera into horizontal and vertical drive signals, wherein said frame synchronizing pulse has a level higher than the white level or lower than the black level of a composite video signal generated by said television camera, the method comprising the steps of:
    separating said frame synchronizing pulse transmitted over said video transmission line from said composite video signal by comparing the level of signals transmitted over said transmission line with a reference signal having a voltage level approximately equal to the voltage level of said frame synchronizing pulse;
    generating horizontal and vertical drive signals on the basis of the separated frame synchronizing pulse; and
    applying the generated horizontal and vertical drive signals to said television camera.

3. An apparatus for converting a vertical drive signal composed of field pulses for synchronizing a television camera into a new synchronizing pulse, comprising:
    first signal processing means receiving said vertical drive signal from means generating said vertical drive signal and generating, on the basis of the received vertical drive signal, a single frame synchronizing pulse signal, for every two field pulses;
    second signal processing means receiving said pulse signal and generating, on the basis of the received pulse signal, a frame synchronizing pulse having a level higher than the white level or lower than the black level of a composite video signal of said television camera;
    third signal processing means receiving a video signal transmitted from said television camera and injecting said frame synchronizing pulse into the received video signal within a period corresponding to a vertical blanking interval in said composite video signal; and
    fourth signal processing means receiving a signal outputted from said third signal processing means and clipping and removing said frame synchronizing pulse from the received signal.

4. An apparatus for converting horizontal and vertical drive signals into a frame synchronizing pulse wherein said vertical drive signal is composed of field pulses for synchronizing a television camera, the apparatus comprising:
    first signal processing means receiving said horizontal and vertical drive signals from means generating said signals and generating, on the basis of the received horizontal and vertical drive signals, a single pulse signal for every two field pulses;
    second signal processing means receiving said pulse signal and generating, on the basis of the received pulse signal, a frame synchronizing pulse having a level higher than the white level or lower than the black level of a composite video signal of said television camera;
    third signal processing means receiving a video signal transmitted from said television camera and injecting said frame synchronizing pulse into the received video signal within a period corresponding to a vertical blanking interval in said composite video signal; and
    fourth signal processing means receiving a signal outputted from said third signal processing means and clipping and removing said frame synchronizing pulse from the received signal.

5. An apparatus for converting a composite synchronizing signal composed of horizontal and vertical synchronizing signals into a new synchronizing pulse, wherein a vertical synchronizing signal is composed of field pulses for synchronizing a television camera, the apparatus comprising:
    first signal processing means receiving said composite synchronizing signal from means generating said composite synchronizing signal and generating, on the basis of the received composite synchronizing signal, a single pulse signal for every two field pulses;

second signal processing means receiving said pulse signal and generating, on the basis of the received pulse signal, a frame synchronizing pulse having a level higher than the white level or lower than the black level of a composite video signal of said television camera;

third signal processing means receiving a video signal transmitted from said television camera and injecting said frame synchronizing pulse into the received video signal within a period corresponding to a vertical blanking interval in said composite video signal; and fourth signal processing means receiving a signal outputted from said third signal processing means and clipping and removing said frame synchronizing pulse from the received signal.

6. An apparatus for converting a composite video signal incorporating a composite synchronizing signal composed of horizontal and vertical synchronizing signals into a new synchronizing pulse, wherein a vertical synchronizing signal is composed of field pulses for synchronizing a television camera, the apparatus comprising:

first signal processing means receiving said composite video signal from means generating said composite video signal, separating said composite synchronizing signal from the received composite video signal, and generating, on the basis of the separated composite synchronizing signal, a single pulse signal for every two field pulses;

second signal processing means receiving said pulse signal and generating, on the basis of the received pulse signal, a frame synchronizing pulse having a level higher than the white level or lower than the black level of said composite video signal;

third signal processing means receiving a video signal transmitted from said television camera and injecting said frame synchronizing pulse into the received video signal within a period corresponding to a vertical blanking interval in said composite video signal; and fourth signal processing means receiving a signal outputted from said third signal processing means and clipping and removing said frame synchronizing pulse from the received signal.

7. An apparatus for converting a frame synchronizing pulse transmitted via a video transmission line connected to a television camera into a composite synchronizing signal, said frame synchronizing pulse having a level higher than the white level or lower than the black level of a composite video signal generated by said television camera, the apparatus comprising:

signal processing means for separating said frame synchronizing pulse transmitted over said video transmission line from said composite video signal by comparing a level of signals transmitted over said video transmission line with a reference signal having a voltage level approximately equal to the voltage level of said frame synchronizing pulse, for generating the composite synchronizing signal on the basis of the separated frame synchronizing pulse, and for applying the generated composite synchronizing signal to said television camera.

8. An apparatus for converting a frame synchronizing pulse transmitted via a video transmission line connected to a television camera into a horizontal and vertical drive signals, said frame synchronizing pulse having a level higher than the white level or lower than the black level of a composite video signal generated by said television camera, the apparatus comprising:

signal processing means for separating said frame synchronizing pulse transmitted over said video transmission line from said composite video signal by comparing a level of signals transmitted over said video transmission line with a reference signal having a voltage level approximately equal to the voltage level of said frame synchronizing pulse, for generating the horizontal and vertical drive signals on the basis of the separated frame synchronizing pulse, and for applying the generated horizontal and vertical drive signals to a terminal connected to the television camera.

* * * * *